(12) United States Patent
Suzuki

(10) Patent No.: US 10,495,841 B2
(45) Date of Patent: Dec. 3, 2019

(54) LENS BARREL AND IMAGING DEVICE

(71) Applicant: RICOH IMAGING COMPANY, LTD., Tokyo (JP)

(72) Inventor: Yohsuke Suzuki, Kanagawa (JP)

(73) Assignee: RICOH IMAGING COMPANY, LTD., Tokyo (JP)

(*) Notice: Subject to any disclaimer, the term of this patent is extended or adjusted under 35 U.S.C. 154(b) by 87 days.

(21) Appl. No.: 15/664,090

(22) Filed: Jul. 31, 2017

(65) Prior Publication Data
US 2018/0039042 A1 Feb. 8, 2018

(30) Foreign Application Priority Data

Aug. 3, 2016 (JP) ................................. 2016-152373

(51) Int. Cl.
| | |
|---|---|
| *G02B 7/04* | (2006.01) |
| *G02B 7/02* | (2006.01) |
| *G03B 5/06* | (2006.01) |
| *G03B 17/14* | (2006.01) |
| *G03B 17/56* | (2006.01) |

(52) U.S. Cl.
CPC ............. *G02B 7/04* (2013.01); *G02B 7/021* (2013.01); *G02B 7/023* (2013.01); *G02B 7/026* (2013.01); *G03B 5/06* (2013.01); *G03B 17/14* (2013.01); *G03B 17/565* (2013.01)

(58) Field of Classification Search
CPC . G02B 7/02; G02B 7/04; G02B 7/023; G02B 7/021; G02B 7/026; G02B 7/10; G02B 7/102; G02B 7/14; G03B 5/06; G03B 3/02; G03B 3/10; G03B 17/14; G03B 17/565

USPC ....... 359/700, 701, 704, 694, 699, 811, 819, 359/821, 822, 823, 826
See application file for complete search history.

(56) References Cited

U.S. PATENT DOCUMENTS

| | | | |
|---|---|---|---|
| 4,690,505 A | 9/1987 | Iizuka et al. | |
| 2005/0280908 A1* | 12/2005 | Tanaka | G02B 7/021 359/811 |
| 2010/0103307 A1 | 4/2010 | Iwasaki | |
| 2013/0107381 A1* | 5/2013 | Ezawa | G02B 7/023 359/823 |

FOREIGN PATENT DOCUMENTS

| | | |
|---|---|---|
| JP | 61-004915 A | 1/1986 |
| JP | U07-003372 B | 1/1995 |
| JP | 10-293240 A | 11/1998 |
| JP | 2002-357755 A | 12/2002 |
| JP | 2003-066308 A | 3/2003 |
| JP | 2008-242068 A | 10/2008 |

* cited by examiner

*Primary Examiner* — Jie Lei
(74) *Attorney, Agent, or Firm* — Greenblum & Berstein, P.L.C.

(57) ABSTRACT

A number of lenses are provided in a lens barrel along the optical axis direction, and two lenses, among the multiple lenses, are structured so that their inclination can be adjusted independently. Tilt adjustments for a lens frame of one lens, which is arranged on the opening side of the lens barrel in the optical axis direction, can be made through an opening of the lens barrel. The other lens frame of the other lens, which is arranged in the middle of the multiple lenses, is structured so that inclination adjustments can be made through throughholes that are provided to penetrate the peripheral surface of the lens barrel in the diameter direction.

9 Claims, 13 Drawing Sheets

LENS BARREL AND IMAGING DEVICE

FIELD OF THE INVENTION

The present invention relates to a lens barrel that can adjust the optical axis of lenses provided in the barrel, and an imaging device that takes a still image or a movie of a photographing object by using the lens barrel.

DESCRIPTION OF THE RELATED ART

The lens barrel of an imaging device—for example, a single-lens reflex camera—is formed by assembling a number of lenses in a barrel that is formed in a cylindrical shape. These multiple lenses are each formed with a single-element lens or a lens group that combines a number of single-element lenses. Here, these single-element lenses and lens groups will be referred to as "lenses." In this way, when a number of lenses are provided in a lens barrel, in order to improve the image quality of photographed images, such as aberration performance, it is necessary to make adjustments so that the optical axis of each lens matches or assumes a predetermined positional relationship. The optical axis of each lens is defined by the line that links between the curvature centers of lenses, and, when the number of lenses and lens groups increases, the optical axis is more likely to be out of position, and therefore more meticulous optical axis adjustments are required.

One way of adjusting the optical axis of such a group of lenses is to adjust the inclination of the principal plane of the lenses—that is, apply tilt adjustments to adjust the angle of the inclination of the principal plane with respect to the optical axis—the tilt angle—and a tilt mechanism is provided to serve this purpose. The tilt mechanism may be, for example, the tilt mechanisms provided in Japanese Patent Application Publication No. 2008-242068 (Patent Literature 1) and Japanese Patent Application Publication No. 2002-357755 (Patent Literature 2). These are both comprised of cam mechanisms that are provided in multiple parts along the circumferential direction of lenses, and are structured so that tilt adjustments are made by displacing these parts in the barrel-axis direction by means of the cam mechanisms. In Patent Literature 1, cam mechanisms are provided in three parts in the circumferential direction, and, in Patent Literature 2, cam mechanisms are provided in two parts, in both the X direction and the Y direction in a plane substantially orthogonal to the optical axis.

The tilt mechanisms of Patent Literature 1 and Patent Literature 2 are both mechanisms that make tilt adjustments by operating cams from the barrel-axis direction. Given a lens barrel that is comprised of a number of lenses, when tilt adjustments are applied to a number of lenses, although it is possible to make tilt adjustments with respect to lenses that are arranged at ends in the barrel-axis direction, these tilt mechanisms cannot be applied, on an as-is basis, to lenses that are arranged halfway in the optical axis direction inside the lens barrel.

As mentioned above, when a lens barrel is formed with multiple lenses, there is a problem that the amount of displacement of each lens's optical axis piles up, and therefore more meticulous tilt adjustments need to be made. However, the places where tilt adjustments can be made with the tilt mechanisms of Patent Literature 1 and Patent Literature 2 are limited, which makes sufficient adjustments difficult.

Furthermore, not any lenses can be used for tilt adjustments, and tilt adjustments need to be made using lenses that are sensitive enough for adjustments. When parts that are subject to adjustments are limited, this might result in a limited optical design, taking into consideration the locations where adjustments can be made and the sensitivity of lenses, and therefore the flexibility of design decreases.

Furthermore, although, according to both Patent Literature 1 and Patent Literature 2, the lens group located nearest the photographing object side is subject to adjustments, given the constraints in the design of lenses, the lens group located nearest the photographing object side is likely to have a large lens diameter, and tends to be large in mass. When adjustments are made in one place on the photographing object side like this, constraints in design, such as the diameter of lenses, the mass of lenses and so on make the flexibility of design even lower. Furthermore, when lenses have a large diameter and large in mass, if an impact and so on are applied after adjustments are made, the lenses are likely to be out of position, and, besides, given the problem that accurate adjustments are difficult to achieve by making adjustments in one place, it has heretofore been difficult to make meticulous tilt adjustments with conventional methods.

SUMMARY OF THE INVENTION

It is an object of the present invention to provide a lens barrel that is comprised of a number of lenses, and that makes it possible to adjust the inclination of two or more lenses among these. Also, it is an object of the present invention to provide a lens barrel with an inclination adjustment mechanism that allows reliable inclination adjustments. Furthermore, the present invention provides an imaging device, such as a camera, with this lens barrel.

The lens barrel of the present invention is structured so that a plurality of lenses are provided in the lens barrel along the optical axis direction, and the inclination of two or more lenses among the plurality of lenses with respect to the optical axis can be adjusted independently.

For example, the lens barrel of the present invention is structured so that the inclination of one lens arranged on the opening side of the lens barrel in the optical axis direction can be adjusted through the opening, and the inclination of the other lenses can be adjusted through throughholes, which are provided to penetrate the peripheral surface of the lens barrel in the diameter direction.

The present invention provides a lens barrel with an inclination adjustment mechanism, which adjusts the angle of inclination of a lens frame for holding a lens with respect to the optical axis, and the lens barrel has sliding cams, which are disposed in a plurality of places in the lens barrel in the circumferential direction, and which can be moved and adjusted in the circumferential direction, and cam projections, which are disposed in a plurality of places in the lens frame in the circumferential direction, and, in the lens barrel, the sliding cams each comprise a cam groove, the location of which with respect to the optical axis is displaced in the circumferential direction, and the cam projections are structured so that the cam projections are engaged in the cam grooves, and the position of movement of the cam projections in the optical axis direction is adjusted by movement of the sliding cams in a state the cam projections are constrained to the optical axis direction by the cam grooves.

The lens barrel has a pressing piece, which biases the cam projections in the optical axis direction, and the cam projections abut on one lateral surface of the cam grooves in the optical axis direction. The sliding cams are sandwiched between a ring member, which is attached to a barrel member constituting the lens barrel, and the barrel member, in the optical axis direction, and the pressing piece is formed integrally with the ring member.

The present invention provides a lens barrel with an inclination adjustment mechanism, which adjusts the angle of inclination of a lens frame for holding a lens with respect to the optical axis, and the lens barrel has cylindrical cams, which are disposed in a plurality of places in the lens barrel in the circumferential direction, and which can be rotated and adjusted, cam arms, which are disposed in a plurality of places in the lens frame in the circumferential direction, and a biaser, which biases the cam arms in the optical axis direction towards the cylindrical cams, and, in the lens barrel, a circumferential surface of the cylindrical cams is structured as a cam surface, the diameter size of which changes in the circumferential direction, and the cam arms are structured so that the cam arms abut on the cam surface in the optical axis direction, and the location of the cam arms in the optical axis direction is adjusted by changing the position where the cylindrical cams are rotated.

According to present invention, the lens barrel has throughholes, which are opened in a part of a barrel member and a ring member in a diameter direction, and the cylindrical cams are exposed to the outside of the lens barrel through the throughholes. Also, the lens barrel has a structure, which is rotated relatively about the barrel axis in a state that the barrel member and the ring member overlap in the diameter direction, the throughholes, which are opened in the diameter direction, are provided in predetermined locations in the barrel member and the ring member, and each throughholes overlaps in a rotational position of the barrel member and the ring member, and the cylindrical cams are exposed to outside of the barrel through these throughholes. In this case, the throughholes are preferably closed with a covering member that is disposed in a peripheral surface of the barrel members and the ring members.

The present invention is structured in the form of an imaging device with a lens barrel formed as described above.

According to the present invention, it is possible to adjust the inclination of two or more lenses, so that adequate improvement of optical performance can be achieved.

The present disclosure relates to subject matter contained in Japanese Patent Application No. 2016-152373 (filed on Aug. 3, 2016) which is expressly incorporated herein by reference in its entirety.

DESCRIPTION OF THE EMBODIMENT

Figure 1:
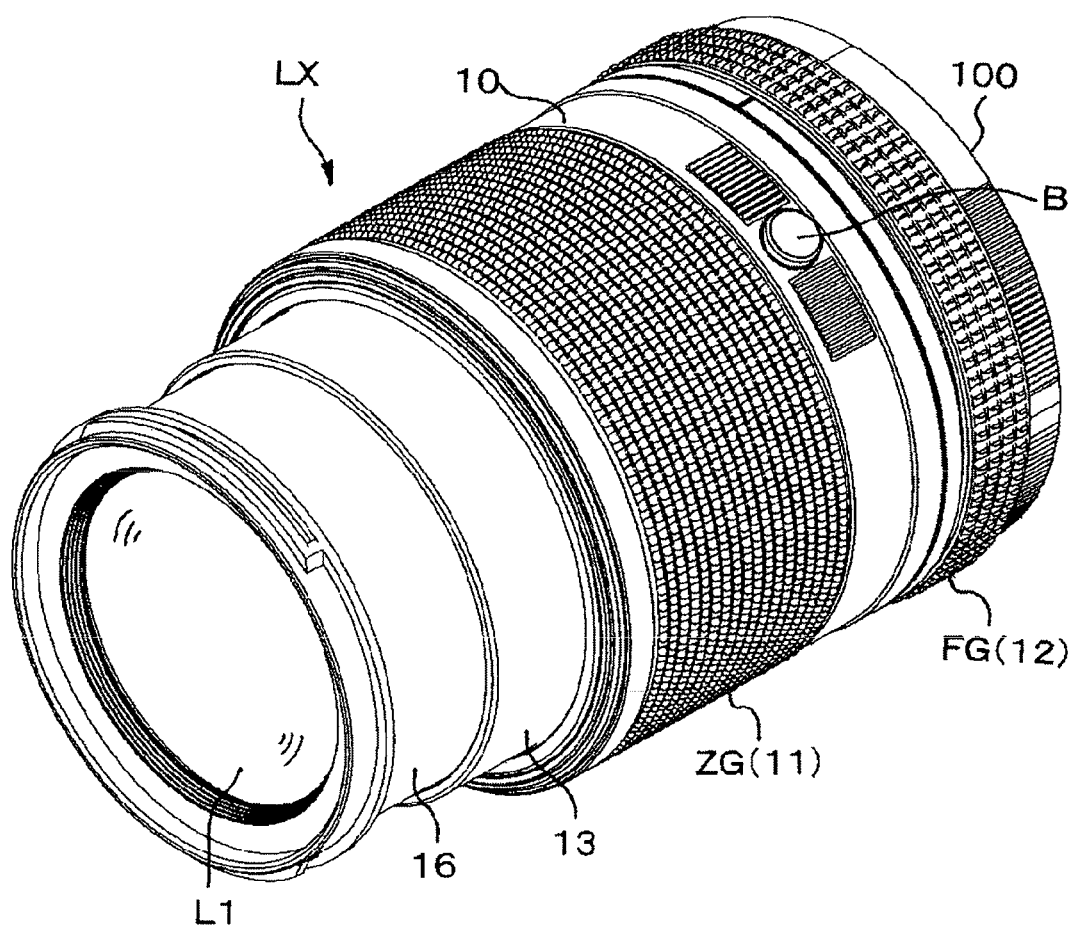
FIG. 1 is an outer perspective view of a lens barrel according to an embodiment.

An embodiment of the present invention will be described with reference to the accompanying drawings. FIG. 1 is an outer perspective view of a lens barrel LX according to the present invention, formed as a zoom interchangeable lens for a single-lens reflex camera (imaging device) 1 (see FIG. 2 and FIG. 3). A camera body 2 of the single-lens reflex camera 1 is provided on the front thereof with a lens mount to which the lens barrel LX is detachably attached. The camera body 2 is provided thereinside at a position behind the lens mount with a quick-return mirror 3 and an image sensor 4.

The lens barrel LX can be attached to/removed from the camera body 2 by means of a lens mount 100 that is provided in a fixing barrel 10, and can move to the long-focus (telephoto) side and the short-focus (wide-angle) side by rotating/operating a zoom ring 11. Also, by operating the zoom ring 11 further to the short-focus side while pressing a retraction button B disposed in an outer peripheral surface, it is possible to move the lens barrel LX in retracted mode, in which the length of the lens barrel LX is the shortest. Focusing is made automatically by driving a motor that is mounted in the camera body 2 or the lens barrel LX, and it is possible to perform manual focusing by rotating/operating a focus ring 12.

Figure 2:
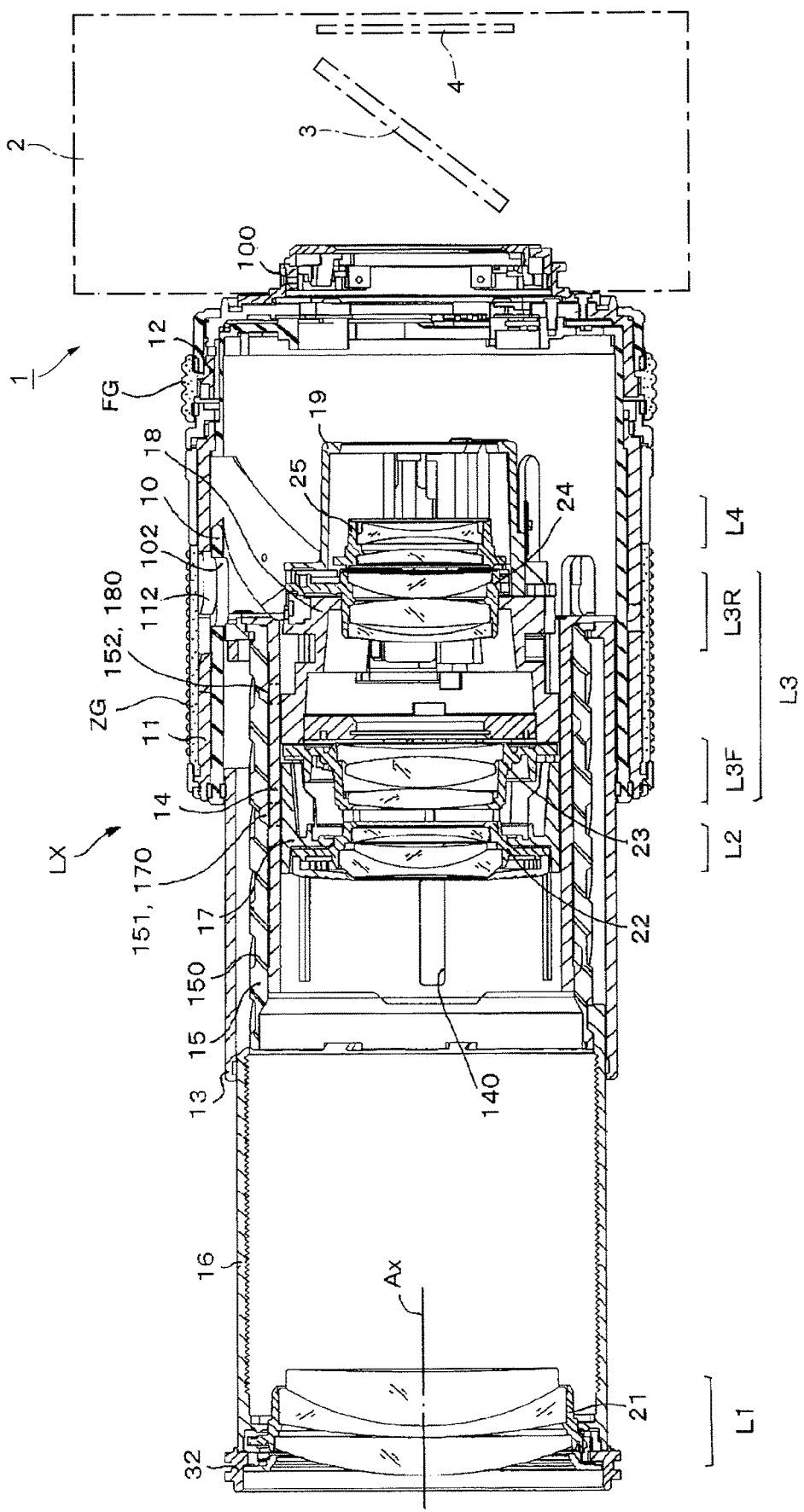
FIG. 2 is a vertical cross-sectional view of the lens barrel in telephoto mode along the optical axis.
Figure 3:
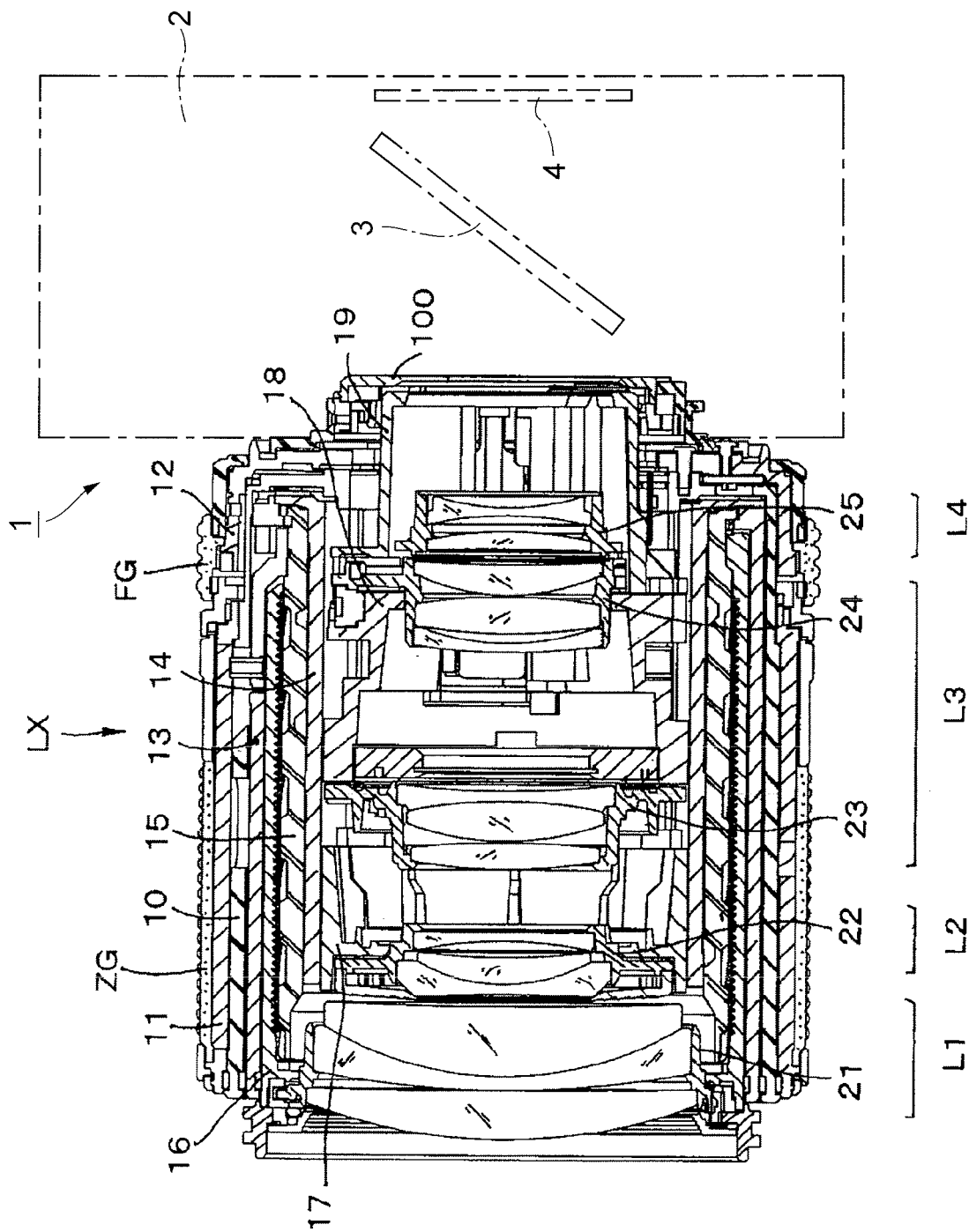
FIG. 3 is a cross-sectional view of the lens barrel in retracted mode along the optical axis.

FIG. 2 and FIG. 3 show cross-sectional views of the lens barrel LX along the optical axis Ax, and show telephoto mode and retracted mode, respectively. As shown in FIG. 2 and FIG. 3, the lens barrel LX is formed as a zoom lens, in which an optical system is comprised of a first lens group (positive-power) L1, a second lens group (negative-power) L2, a third lens group (positive-power) L3 and a fourth lens group (negative-power) L4, from the front side (the photographing object side, and the same will hold hereinafter). These first to fourth lens groups L1 to L4 are each formed as a lens group that is comprised of a number of single-element lenses. As will be described later, the third lens group L3 is comprised of a third front lens group (positive-power) L3F and a third rear lens group (positive-power) L3R. In this embodiment, among these lens groups, the first lens group L1 and the third rear lens group L3R are structured so that their inclination can be adjusted. Note that, hereinafter, inclination adjustments is referred to as "tilt adjustments," and the inclination adjustment mechanisms is referred to as "tilt mechanisms."

The lens barrel LX has a fixing barrel 10, and a lens mount 100 is fixed to the rear-side surface of the fixing barrel 10. Here, the rear side refers to the camera body side, and the same will hold hereinafter. In the peripheral surface of the fixing barrel 10, the zoom ring 11 is fitted in the front-side area in the optical axis direction (the direction along the optical axis Ax, and the same will hold hereinafter), and the focus ring 12 is fitted in the rear-side area. Rubber rings ZG and FG are fixed in the peripheral surfaces of these zoom ring 11 and focus ring 12, respectively, to provide improved touch upon operation.

Figure 12:
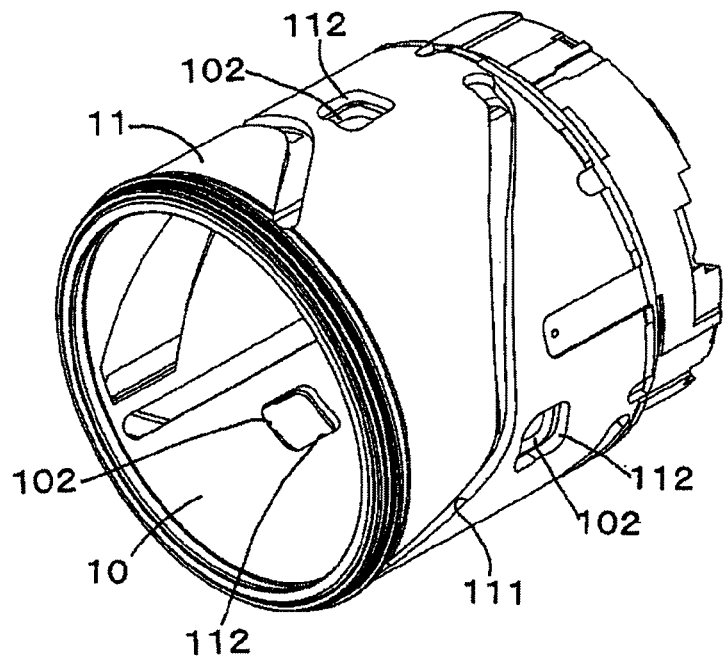
FIGS. 12(A) and 12(B) show perspective views showing the relative rotation state of a fixing barrel and a zoom ring in telephoto mode and wide-angle mode.
Figure 12:
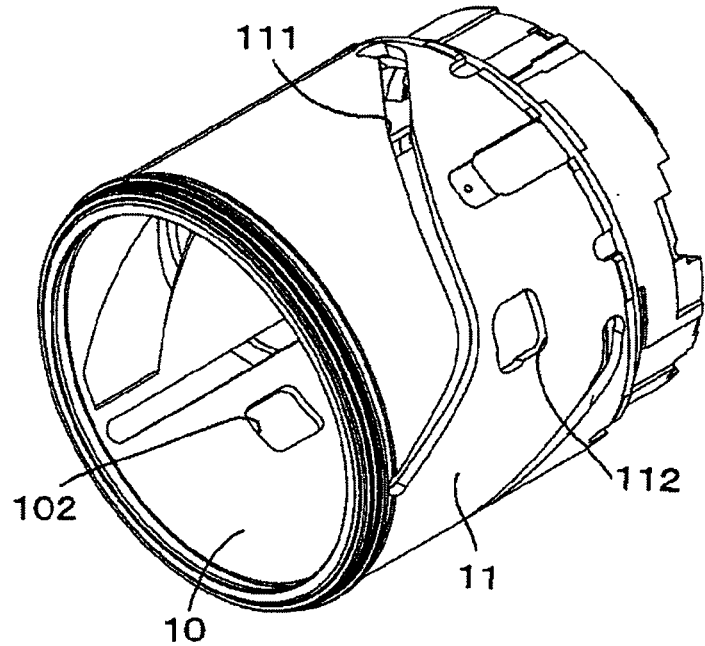

Inside the fixing barrel 10, an outer linear-moving barrel 13 and an inner linear-moving barrel 14, which are arranged coaxially with a predetermined gap in between in the barrel-diameter direction, are provided. These linear-moving barrels 13 and 14 are mutually integrated as one in each rear-side end portion, and, being cam-engaged with a linear groove 101, which is formed in the fixing barrel 10, and which is oriented in the optical axis direction, and a cam groove 111, which is formed in the zoom ring 11, move linearly in the optical axis direction, as one, inside the fixing barrel 10, by the rotation of the zoom ring 11. Note that the linear groove 101 and the cam groove 111 will be shown in FIG. 12 and FIG. 13, which will be referenced later in the following description.

A helicoid barrel 15, with a helicoid groove 151 formed in its outer peripheral surface, is fitted in the outer periphery of the inner linear-moving barrel 14. Although the helicoid barrel 15 moves in the barrel-axis direction as one with the inner linear-moving barrel 14, the helicoid barrel 15 is inter-linked with the zoom ring 11, and moves and rotates about the barrel axis on the peripheral surface of the inner linear-moving barrel 14 by the rotation of the zoom ring 11. A front linear-moving barrel 16 is fitted between the helicoid barrel 15 and the outer linear-moving barrel 13 in the diameter direction. The front linear-moving barrel 16 is fitted in the helicoid groove 150 of the helicoid barrel 15, and moves in the optical axis direction by the rotation of the helicoid barrel 15. The first lens group L1 is supported in the front-side end portion of the front linear-moving barrel 16.

Inside the inner linear-moving barrel 13, a front lens moving barrel 17 and a rear lens moving barrel 18 are provided side by side in the optical axis direction. In the front lens moving barrel 17 and the rear lens moving barrel 18, cam projections 170 and 180, which each project in the outer diameter direction, are provided respectively. The cam projections 170 and the cam projections 180 are inserted in a linear groove 140, provided in the inner linear-moving barrel 14, and cam-engaged in cam grooves 151 and 152 provided in the inner peripheral surface of the helicoid barrel 15. By this means, the front lens moving barrel 17 and the rear lens moving barrel 18 are moved in the optical axis direction, independently, by the rotation of the helicoid barrel 15. The second lens group L2 is supported in the front lens moving barrel 17, and the third lens group L3 is supported in the rear lens moving barrel 18.

A lens holding barrel 19 is fixedly supported in the rear end portion of the rear lens moving barrel 18, and integrally moves with the rear lens moving barrel 18. The fourth lens group L4 is supported so as to be able to move in the optical axis direction inside the lens holding barrel 19.

To describe the first to fourth lens groups L1 to L4 in detail, the first lens group L1 is comprised of three single-element lenses, and supported in the front end portion of the front linear-moving barrel 16 by means of a first lens frame 21. The first lens group L1 is provided so that tilt adjustments of the first lens frame 21 can be made with respect to the front linear-moving barrel 16. The first lens group L1 is structured to be large in mass compared to the other lens groups L2 to L4.

The second lens L2 is comprised of three single-element lenses, and fixedly supported to the front lens moving barrel 17 by means of a second lens frame 22.

As described above, the third lens group L3 is formed with the third front lens group L3F and the third rear lens group L3R. The third front lens group L3F is comprised of three single-element lenses, and fixedly supported to the rear lens moving barrel 18 by means of a third front lens frame 23. The third rear lens group L3R is comprised of three single-element lenses, and supported in the rear lens moving barrel 18 by means of a third rear lens frame 24 so that tilt adjustments can be made.

The fourth lens group L4 is comprised of two single-element lenses, and supported, by means of a fourth lens frame 25, so as to be able to move in the optical axis direction inside the lens holding barrel 19. Although detailed description will be omitted with present embodiment, a focus drive part, which is made up of a motor, a screw mechanism and so on, is provided in the rear lens moving barrel 18, and the fourth lens group L4 is supported inside the lens holding barrel 19 by means of this focus drive part, and, furthermore, moves in the optical axis direction by the movement of the focus drive part, and focusing is thus performed.

Each operation of zooming and focusing of the lens barrel LX structured as described above will be described briefly. When the zoom ring 11 is rotated/operated, the outer linear-moving barrel 13 and the inner linear-moving barrel 14, which are cam-engaged, move in the optical axis direction as one. That is, when the zoom ring 11 is operated to the telephoto side, both linear-moving barrels 13 and 14 move forward, and, when the zoom ring 11 is operated to the wide-angle side, both linear-moving barrels 13 and 14 move rearward. Following the movement of both of these linear-moving barrels 13 and 14, the helicoid barrel 15 moves in the optical axis direction as one, and, furthermore, rotates about the barrel-axis by the cam engagement with the zoom ring 11.

By the rotation of the helicoid barrel 15, the front linear-moving barrel 16 moves in the optical axis direction, and the first lens group L1 supported therein is extended and/or retracted. At the same time, by the rotation of the helicoid barrel 15, the cam-engaged front lens moving barrel 17 and rear lens moving barrel 18 move in the optical axis direction, and the second lens group L2 and the third lens group L3 each move in the optical axis direction. Also, by the movement of the rear lens moving barrel 18, the lens holding barrel 19 and the fourth lens group L4 move in the optical axis direction.

By operating the zoom ring 11 in this way, the first lens group L1, the second lens group L2, the third lens group L3 and the fourth lens group L4 each move in the optical axis direction, and thus zooming is performed. When the zoom ring 11 is operated in the telephoto direction, telephoto mode (telephoto extremity) is set as shown in FIG. 2, and, when the zoom ring 11 is operated in the opposite direction, wide-angle mode (wide-angle extremity) is set. As mentioned above, when the zoom ring 11 is operated further in the wide-angle direction while pressing the retraction button B, retracted mode is set as shown in FIG. 3.

At the same time with the zooming, or apart from the zooming, when auto-focusing operation is executed in the focus drive part, which has not been described, the fourth lens group L4 moves independently in the optical axis direction in the lens holding barrel 19, and thus focusing is performed. Alternatively, focusing is performed manually by operating the focus ring 12.

When assembling the lens barrel LX, tilt adjustments are made as so to adjust the angle of the inclination of the first lens frame 21 of the first lens group L1 and the third rear lens frame 24 of the third rear lens group L3R, which have been mentioned above, with respect to the optical axis Ax. The tilt adjustment mechanism T1 is provided to make tilt adjustments with respect to the first lens group L1, and the tilt mechanism T3 is provided to make tilt adjustments with respect to the third rear lens group L3R.

Figure 4:
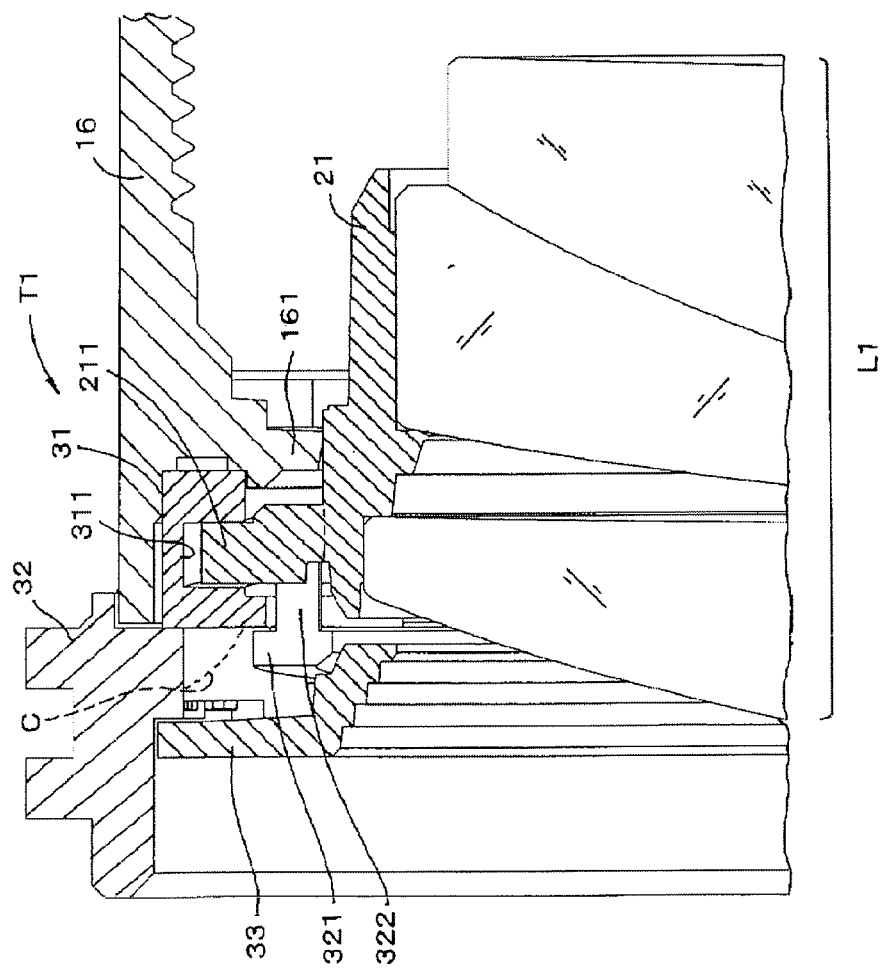
FIG. 4 is an enlarged cross-sectional view of a part including a tilt mechanism T1.
Figure 5:
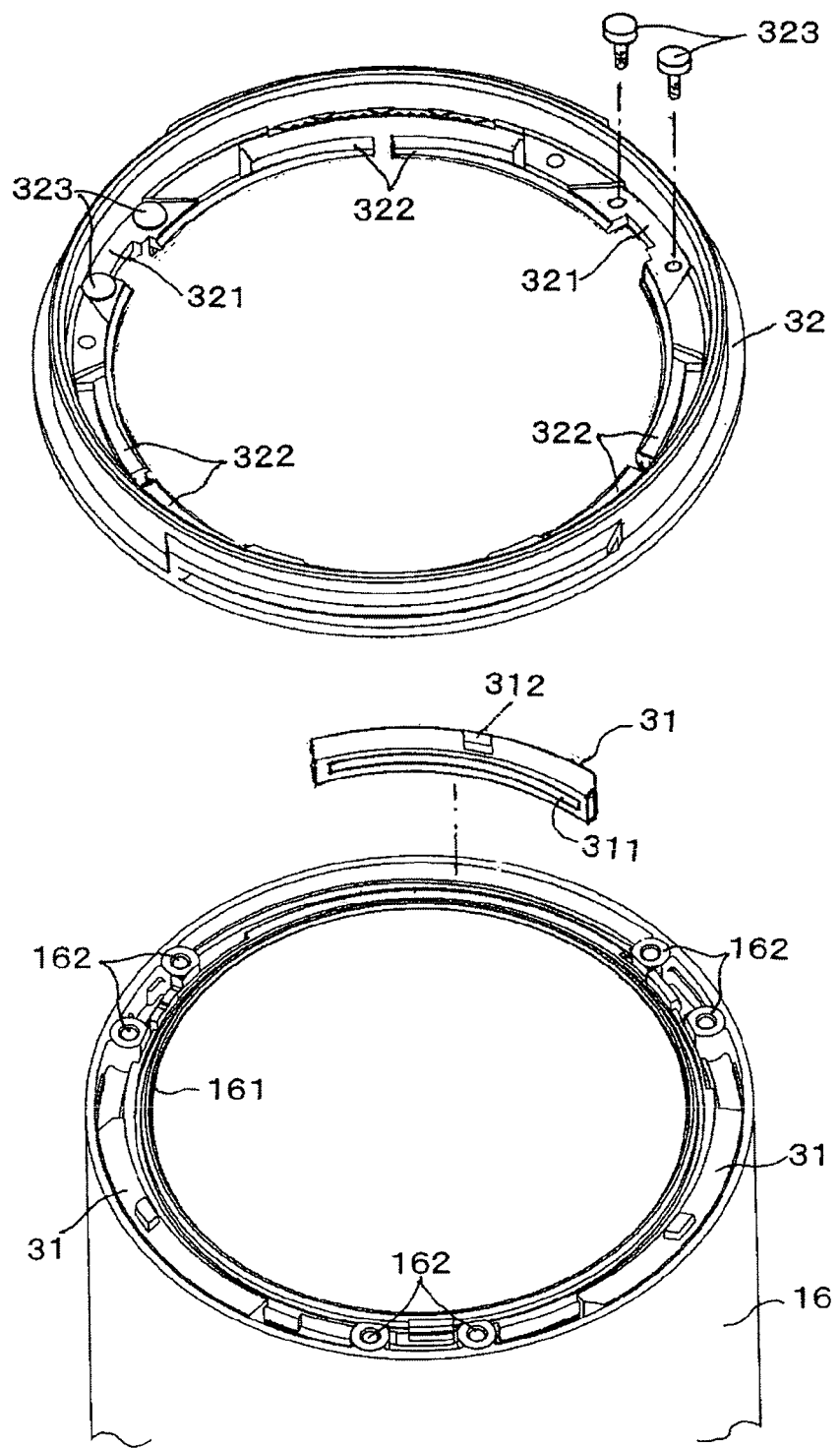
FIG. 5 is a perspective view disassembling a part of tilt mechanism T1.

FIG. 4 is an enlarged cross-sectional view for explaining principal parts of the tilt mechanism T1 of the first lens group L1, and FIG. 5 is a perspective view, disassembling a part of the lens barrel LX seen from the front side. In the inner periphery of the front-side rim part of the front linear-moving barrels 16, an inner flange 161 is formed integrally in a location a predetermined short distance rearward from the front rim edge. The inner flange 161 is formed so that its cross-section in the optical axis direction is formed in the shape of a groove that is dented on the front, and fixing screw holes 162 are opened in the front surface, in three places that are provided substantially evenly along the circumferential direction. Sliding cams 31, each formed in the shape of an arc, are disposed in locations sandwiched between these fixing screw holes 162 in the circumferential direction.

Figure 6:
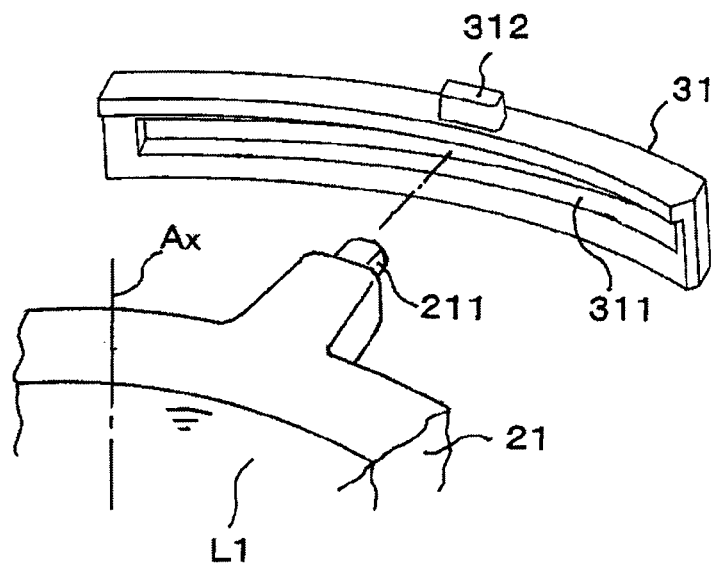
FIGS. 6(A) and 6(B) show a perspective view and a side view of a sliding cam.
Figure 6:
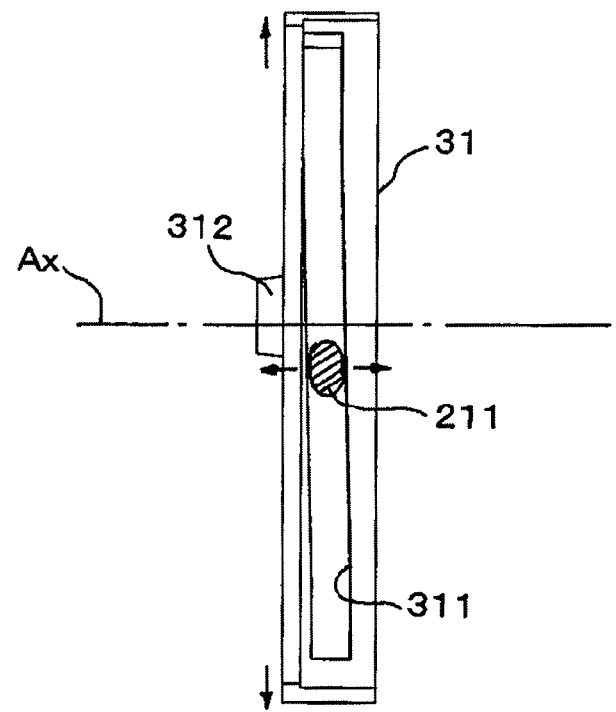

As shown in the perspective view and the side view in FIGS. 6(A) and 6(B), a sliding cam 31 is formed in the shape of an arc having a predetermined arc length, and a cam groove 311, which is recessed and which is oriented in the outer diameter direction, is formed in the inner peripheral surface, which is oriented in the inner diameter direction. Although the cam groove 311 is formed as a groove that has predetermined size in width in the optical axis direction, and which extends in the circumferential direction, the location of the opening of the cam groove 311 is displaced in the optical axis direction along the circumferential direction. That is, a structure is provided here in which the opening location of the cam groove 311 is displaced from the front side to the rear side along the circumferential direction. A projecting part 312 is integrally formed in the front surface of the sliding cam 31, and the projecting part 312 is used when adjusting the location of the sliding cam 31 in the circumferential direction.

Meanwhile, in the outer peripheral surface of the first lens frame 21, cam projections 211, which project in the outer diameter direction, are formed integrally in three places along the circumferential direction. The thickness size of the cam projections 211 in the optical axis direction is made equal to the width size of the cam groove 311, so that the cam projections 211 can be inserted in the cam groove 311. Accordingly, when three of the sliding cams 31 and the first lens frame 21 are assembled to the inner flange 161 of the front linear-moving barrel 16, as shown in FIG. 4, the first lens frame 21 and the sliding cam 31 are assembled, while the cam projection 211 of the first lens frame 21 is inserted in the cam groove 311 of the sliding cam 31.

A front ring 32 is fixed in the front rim part of the front linear-moving barrel 16, from the front side in the optical axis direction. As shown in FIG. 5, in the front ring 32, fastening pieces 321, which project in the inner diameter direction, are provided in three places along the circumference of the inner peripheral surface, and pressing pieces 322, which project from both sides of the fastening pieces 321 along the circumference over a predetermined length, are provided. A pressing piece 322 is formed smaller in size in the diameter direction than a fastening piece 321, and a predetermined gap is provided between the inner peripheral surface of the front ring 32 and the pressing piece 322.

When the front ring 32 is fixed to the inner flange 161 of the front linear-moving barrel 16, small screws 323 are screwed in fixing screw holes 162, which are provided in the inner flange 161, so that the fastening pieces 321 are fixed to the inner flange 161—that is, to the front linear-moving barrel 16. By the fixing, the sliding cam 31 is sandwiched between the inner flange 161 and the fastening piece 321 in the optical axis direction. This sandwiching state is a state in which the sliding cam 31 can be moved in the circumferential direction by applying a certain level of force to the sliding cam 31 in the circumferential direction.

Also, by fixing the front ring 32 as described above, the pressing piece 322 abuts on the front surface of the cam projection 211 of the first lens frame 21. At this time, because a gap is present between the pressing piece 322 and the inner peripheral surface of the front ring 32, the pressing piece 322 does not abut on the sliding cam 31 and does not disturb the movement of the sliding cam 31. The pressing piece 322 is capable of elastic deformation in the optical axis direction, so that the cam projection 211 is biased in the rear-side direction of the optical axis direction by the elastic force produced therefrom, and the cam projection 211 elastically contacts, or abuts on, the inner lateral surface on the rear side of the cam groove 311 of the sliding cam 31.

As shown in FIG. 4, an ornament ring 33 is attached to the inner peripheral surface of the front ring 32 by way of screwing and so on. The ornament ring 33 is formed in the shape of a circular ring, and covers the cam projection 211 of the first lens frame 21, the sliding cam 31 disposed in the inner flange 161 of the front linear-moving barrel 16, the fastening piece 321, the pressing piece 322 and so on, so that these are not exposed to the outside.

The tilt adjustment in the tilt mechanism T1 structured as described above will be described. Before the ornament ring 33 is attached, or in the state in which the ornament ring 33 is removed, three sliding cams 31 are exposed in the front-surface opening of the lens barrel LX—that is, on the front surface side of the first lens group L1. The sliding cams 31 are moved in the circumferential direction, using the convex part 312 of one sliding cam 31 with a tool such as a jig or a screwdriver. As shown in FIG. 6(b), the cam groove 311 of the sliding cam 31 assumes a shape that is uneven along the optical axis direction Ax, so that, if the sliding cam 31 moves in the circumferential direction, the cam projection 211 that is inserted in the cam groove 311 is displaced in the optical axis direction. Consequently, the first lens frame 21 is inclined forward and rearward with respect to the line linking between the other two cam projections (211) as the point of support—that is, with respect to the optical axis.

By applying the same inclining operation to the other two cam projections (211), it is possible to adjust the angle of the inclination of the first lens frame 21 in three-dimensional directions with respect to the optical axis, thus realizing tilt adjustments of the first lens group L1. After tilt adjustments are made, as shown with the broken line in FIG. 4, an adhesive C is applied to the area where the front ring 32 and the sliding cam 31 are in contact, thereby maintaining the state in which tilt adjustments have been made.

Upon this tilt adjustment, the sliding cam 31, sandwiched between the inner flange 161 and the fastening piece 321, slides with frictional force against these, so that the sliding cam 31 is able to move in the circumferential direction, while the locations where the sliding cam 31 has moved is maintained by the frictional force. Also, the cam projection 211 is in elastic contact with the rear-side inner lateral surface of the cam groove 311 by means of the pressing piece 322, so that the first lens frame 21 is prevented from being loose in the optical axis direction. By this means, reliable tilt adjustments can be realized. Furthermore, since the cam projection 211 is caught in the cam groove 311 of the sliding cam 31 in the optical axis direction and cam-engaged in this state, even when the pressing force of the pressing piece 322 weakens, it is still possible to maintain the location of the cam projection 211 in the optical axis direction—that is, the posture of the first lens group L1—in a stable manner.

Since the first lens group L1 is large in mass compared to the other lenses, if the first lens frame 21 is simply structured to abut on the cams, the first lens frame 21 is likely to be out of its adjusted location when an impact is applied. For example, the tilt mechanisms described in Patent Literature 1 and Patent Literature 2 are both structured to make the lens frame part abut on cams by means of spring force, so that, when the spring force of the spring means weakens, the abutting force between the lens frame and the cams lowers, which then makes the state of abutment of the lens frame and the cams unstable, and also makes the state of the inclination of the lens frame unstable. In this embodiment, the cam projection 211 is allowed to be cam-engaged in the cam groove 311 of the sliding cam 31 in this way, so that it is possible to prevent the adjusted location from shifting even when the spring force weakens.

Figure 7:
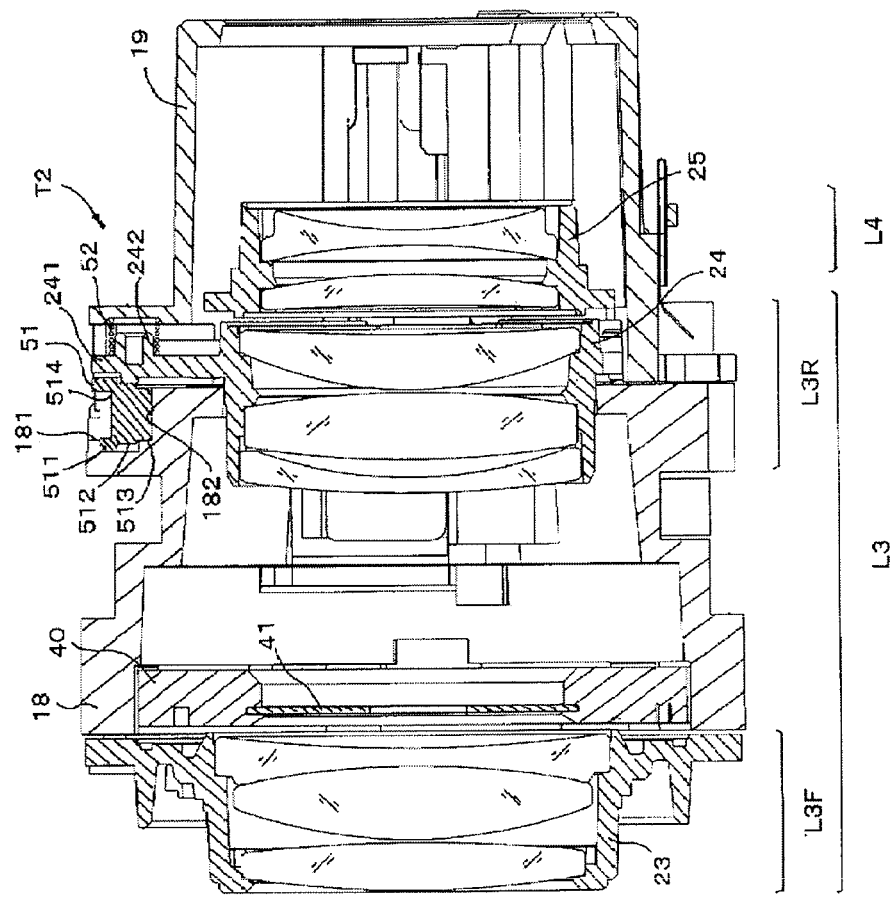
FIG. 7 is an enlarged cross-sectional view of a part of a lens unit including a tilt mechanism T3.

FIG. 7 shows an enlarged cross-sectional view of a unit (hereinafter referred to as the "lens unit") comprised of a rear lens moving barrel 18 and a lens holding barrel 19, which have been mentioned above to explain the tilt mechanism T3 of the third rear lens group L3R. As mentioned above, the third front lens group L3F is supported in the front end portion of the rear lens moving barrel 18 by means of a third front lens frame 23. An aperture mechanism 40 is disposed on the rear surface side of the third front lens frame 23, and fixed to the rear lens moving barrel 18. Although the aperture mechanism 40 has aperture blades 41, the opening of the blades 41 is changed by a motor drive part (not shown in the drawing), the details will be omitted.

Figure 8:
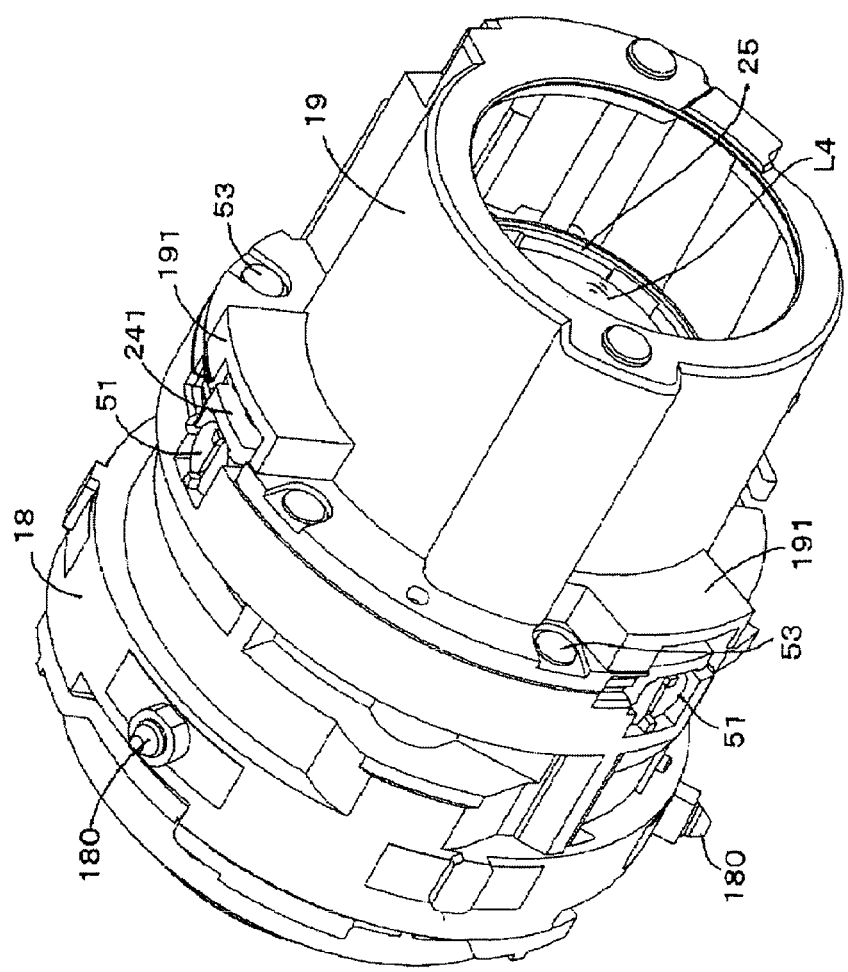
FIG. 8 is an outer perspective view of a lens unit.
Figure 9:
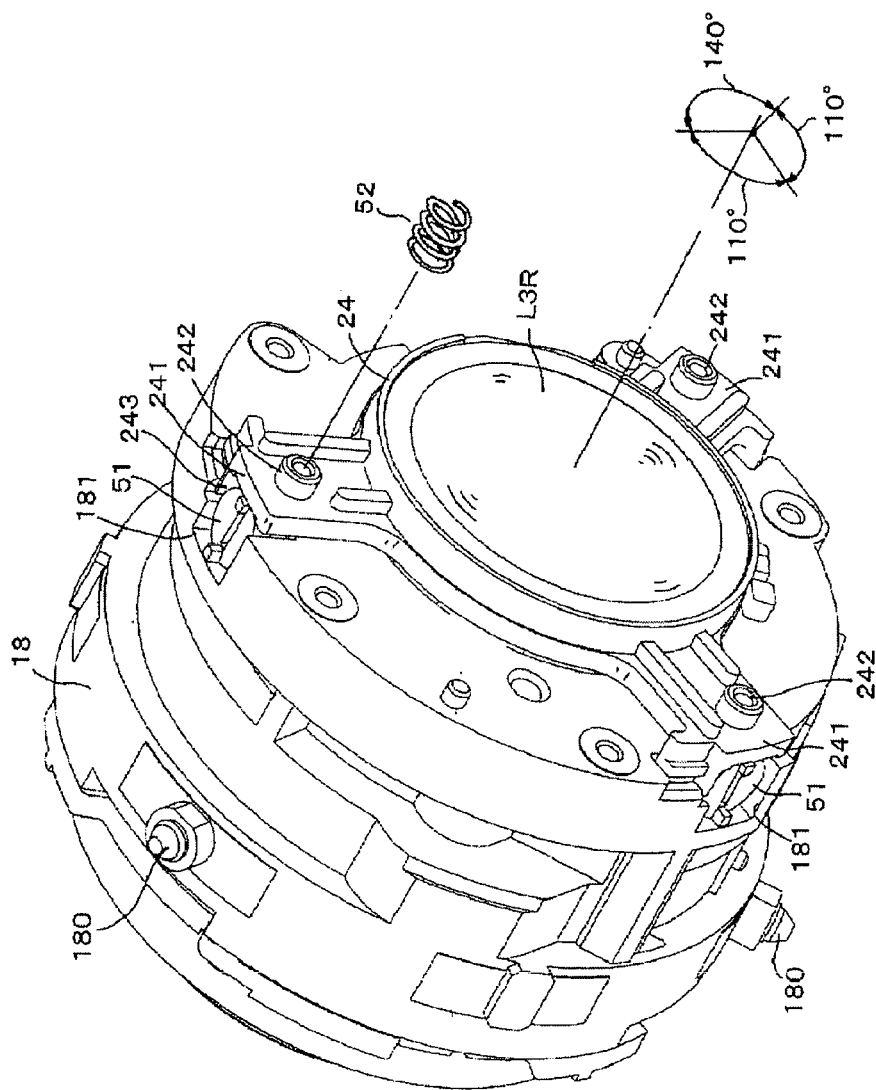
FIG. 9 is an outer perspective view of a lens unit, not including a lens holding barrel.

Meanwhile, as mentioned above, the third rear lens group L3R is supported in the rear lens moving barrel 18, by means of a third rear lens frame 24 so that tilt adjustments can be made. FIG. 8 is an outer perspective view of the lens unit, and FIG. 9 is an outer perspective view showing the state in which the lens holding barrel 19 is removed. As shown in FIGS. 7 to 9, in the outer peripheral surface of the rear end portion of the rear lens moving barrel 18, cam-accommodating recessed parts 181, provided in the form of recesses, turned in the inner diameter direction, are provided in three places along the circumferential direction. Cylindrical cams 51, each cylinder-shaped, are provided inside these cam-accommodating recessed parts 181.

Figure 10:
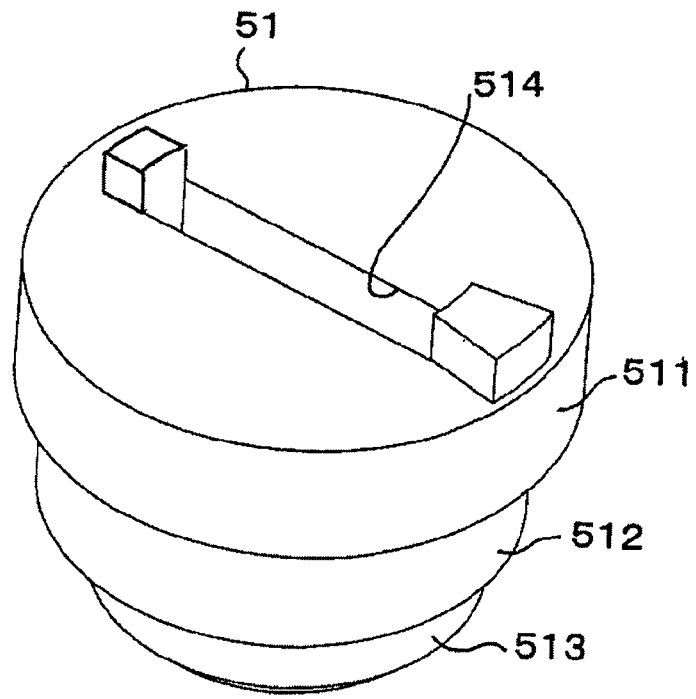
FIGS. 10(A) and 10(B) show a perspective view and a bottom view of a cylindrical cam.
Figure 10:
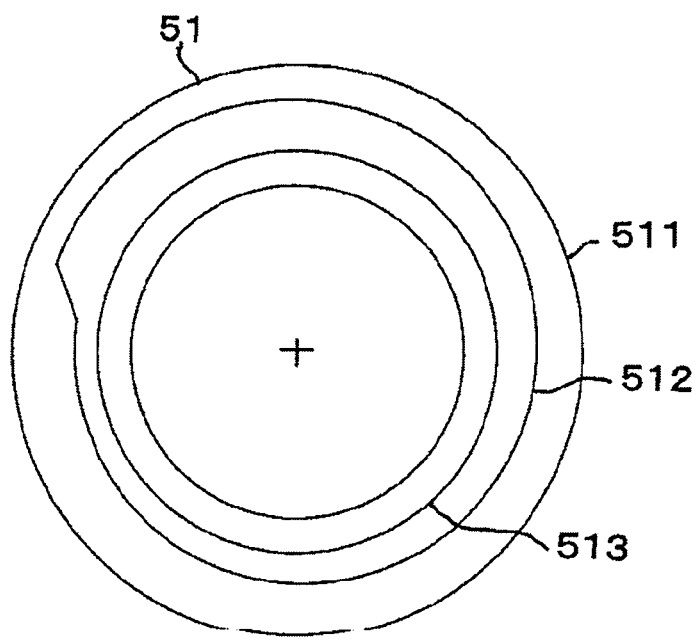

As shown in the perspective view of FIG. 10(A), a cylindrical cam 51 has an operating part 511, which is a short cylinder, a cam part 512, which assumes a similar shape to a cylinder, provided integrally in the bottom surface of the operating part in the column axis direction, and a shaft part 513, which is a small-diameter cylinder provided integrally in the bottom surface of the cam part 512. In the top surface of the operating part 511, a slotted groove 514, in which a screwdriver and so on can be engaged, is formed. FIG. 10(B) is a bottom view of the cylindrical cam 51, and, although the above-noted operating part 511 and shaft part 513 are coaxial cylinders, the outer peripheral surface of the cam part 512 assumes helical shape, in which the size of the diameter about the column axis changes slightly along the circumferential direction, and this outer peripheral surface is formed as a cam surface.

As shown in FIG. 7, in the inner bottom surface of the cam-accommodating recessed part 181, which is turned in the outer diameter direction, a shaft hole 182 is recessed in the inner diameter direction, and the shaft part 513 of the cylindrical cam 51 is inserted in the shaft hole 182. By this means, when rotated/operated about the column axis in the operating part 511, the cylindrical cam 51 is rotated/operated about the shaft part 513 as an axis, inside the cam-accommodating recessed part 181.

In the third rear lens frame 24, cam arms 241 are formed integrally, each as a projection turned in the outer diameter direction, in three places on the circumference corresponding to the cam-accommodating recessed parts 181. The front surface of the cam arms 241 is arranged opposite the cylindrical cams 51 in the optical axis direction, and abut on the outer peripheral surface of the cam part 512—that is, the cam surface—in the optical axis direction. In the rear surface of the cam arm 241, a boss 242 for fitting and supporting a coil spring 52 is formed as a rearward projection. In a part of the cam arm 241, an engaging piece 243 is integrally formed, facing the front in the optical axis direction, and the tip of the engaging piece 243 is allowed to enter the cam-accommodating recessed part 181, so that the third rear lens frame 24 is integrated with the rear lens moving barrel 18 about the optical axis.

The lens holding barrel 19 is fixed in the rear end portion of the rear lens moving barrel 18 by means of fixing screws 53 in a number of places in the circumferential direction. In the front end portion of the lens holding barrel 19, a recessed wall part 191, which is dented rearward in the optical axis direction, is formed in three places along the circumferential direction corresponding to the cam-accommodating recessed parts 181 and the cam arms 241, and the coil spring (biaser) 52 is elastically mounted inside the recessed wall part 191. One end of the coil spring 52 is fitted in the boss 242 of the cam arm 241, and the other end of the coil spring 52 abuts on the inner surface of the recessed wall part 191, so that the cam arm 241 is biased forward in the optical axis direction, and the front surface of the cam arm 241 abuts on the cylindrical cam 51.

In the tilt mechanism T3 structured as described above, a screwdriver and/or the like is fitted in the slotted groove 514 of the cylindrical cam 51 from the outer diameter side of the lens unit to operate the operating part 511 of the cylindrical cam 51 and rotate/adjust the cylindrical cam 51 about the shaft part 513. By the rotation of the cylindrical cam 51, the location where the cam surface of the cam part 512 and the front surface of the cam arm 241 of the third rear lens frame 24 abut each other changes in the optical axis direction. By this means, the third rear lens frame 24 is inclined in the optical axis direction with the other two cam arms (241) serving as points of support. The other two cylindrical cams (51) are also adjusted likewise, so that it is possible to adjust the angle of the inclination of the third rear lens frame 24 with respect to the optical axis in three-dimensional directions, and realize tilt adjustments of the third rear lens group L3R. After tilt adjustments are made, for example, an adhesive is applied inside the cam-accommodating recessed parts 181, so that the state in which tilt adjustments have been made can be maintained.

Figure 11:
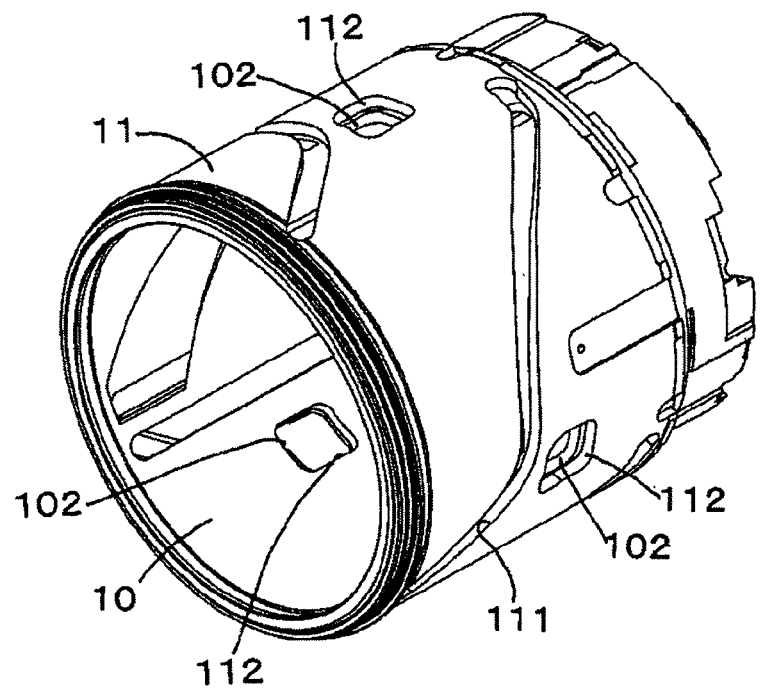
FIGS. 11(A) and 11(B) show perspective views of a fixing barrel and a zoom ring.
Figure 11:
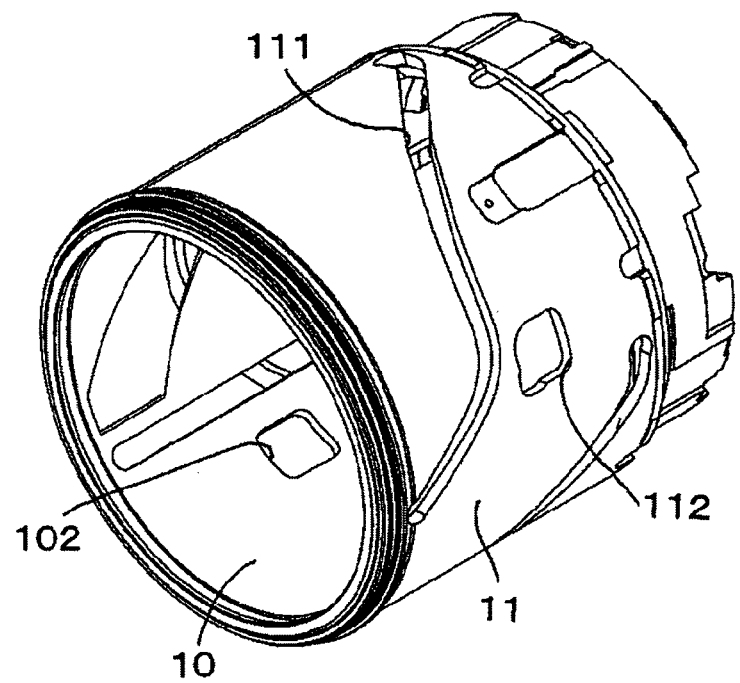

Here, as shown in FIGS. 11(A and 11(B), in the fixing barrel 10 and the zoom ring 11, adjustment holes 102 and 112, which penetrate in the diameter direction, are opened in three places along the circumferential direction. The three adjustment holes 102 of the fixing barrel 10 are in locations in the optical axis direction and the circumferential direction corresponding to the three cylindrical cams 51 provided in the rear lens moving barrel 18. These adjustment holes 102 and 112 are provided in locations where they do not interfere with the linear groove 101 and the cam groove 111 provided in the fixing barrel 10 and the zoom ring 11.

As shown in FIG. 12(A), the three adjustment holes 112 of the zoom ring 11 are in locations to overlap the adjustment holes 102 of the fixing barrel 10 when the zoom ring 11 is operated and the lens barrel LX is rotated into telephoto mode. In this overlapping state, unless the rubber ring (covering member) ZG is attached to the zoom ring 11, the cylindrical cams 51 are exposed to the outside of the lens barrel LX through both adjustment holes 102 and 112. When the zoom ring 11 is rotated into position apart from telephoto mode—for example, wide-angle mode as shown in FIG. 12B) or retracted mode—one of the adjustment holes 102 and 112 of the fixing barrel 10 and the of zoom ring 11 is located to oppose the peripheral surface of the other one, and the adjustment holes 102 and 112 are not in an overlapping state, and therefore the cylindrical cam 51 is not exposed through the adjustment holes 102 and 112.

Figure 13:
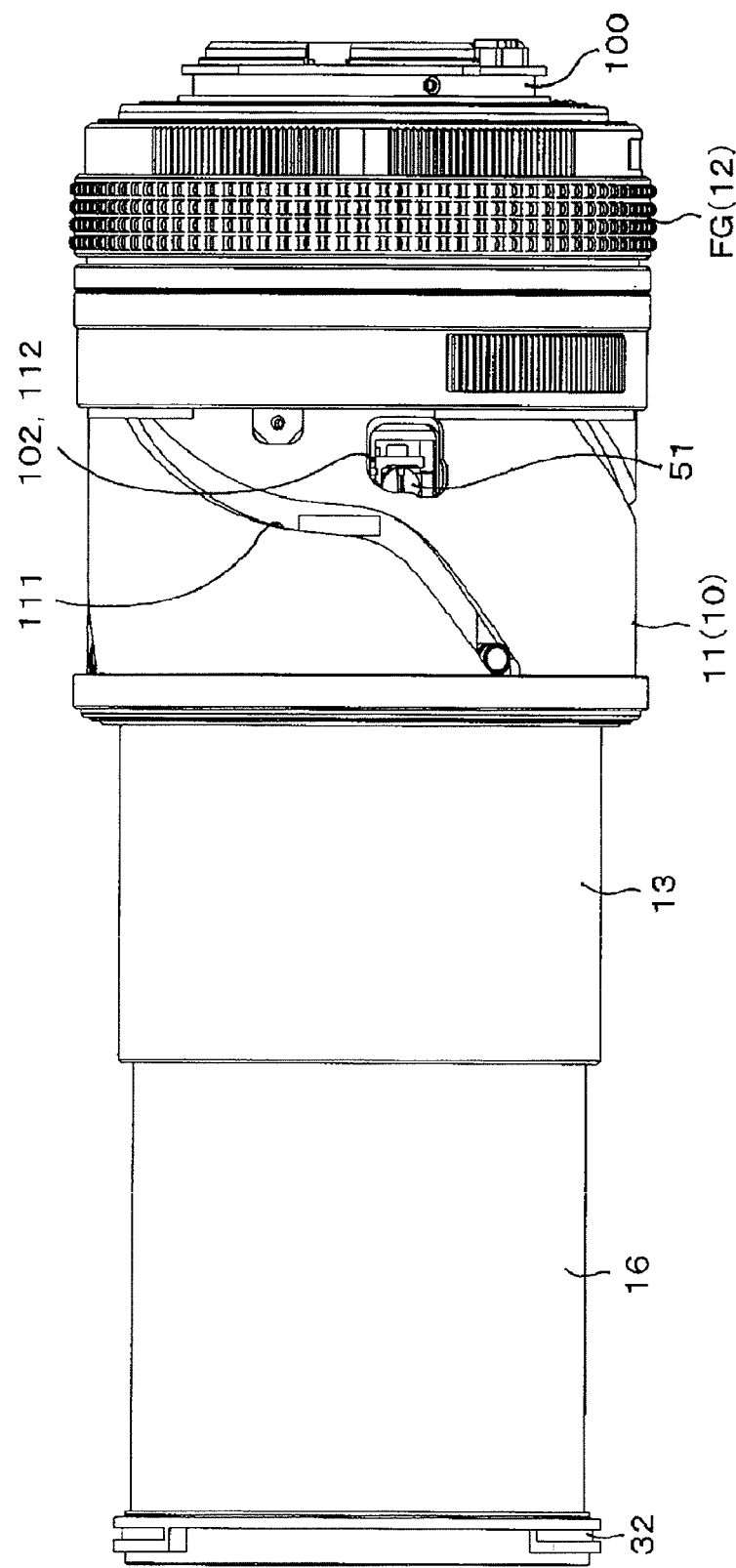
FIG. 13 is an outer side view of a lens barrel in telephoto mode.

Accordingly, in order to make tilt adjustments for the third rear lens group L3R after the lens unit made up of the rear lens moving barrel 24 and the lens holding barrel 19 is assembled in the lens barrel LX, before the rubber ring ZG is attached to the zoom ring 11, the zoom ring 11 is rotated to the telephoto position, and the adjustment holes 102 and 112 of the fixing barrel 10 and the zoom ring 11 are both placed in an overlapping state, thereby assuming a state in which the cylindrical cams 51 are exposed through these adjustment holes 102 and 112. This state is shown in FIG. 13. Given this condition, a screwdriver is inserted into the lens barrel LX, as mentioned above, through these adjustment holes 102 and 112, and the cylindrical cam 51 is adjusted. By making the same adjustments in each of the adjustment holes 102 and 112 in three places in the circumferential direction, tilt adjustments of the tilt mechanism T3 can be realized.

Here, by setting the circumferential locations of the three cylindrical cams 51 and the circumference locations of the cam arms 241 adequately, it is possible to secure space in part of the area in the circumference along the outer peripheries of the rear lens moving barrel 18 and the lens holding barrel 19. As shown in FIG. 9, the relative angles of the three mutually-neighboring cam arms 241 are made 110°, 110° and 140°, so that relatively large space can be secured in the area in the circumference where the relative angle is 140°. According to this embodiment, the focus drive part, which has been mentioned above, is disposed in this space, so that the lens barrel LX is prevented from having a large diameter for no particular reason.

As mentioned above, the lens barrel LX of the present embodiment is structured so that tilt adjustments can be made with respect to the first lens group L1 and the third rear lens group L3R. When the lens barrel LX is actually assembled, first, tilt adjustments are applied to the third rear lens group L3R, and, next, tilt adjustments are applied to the first lens group L1. After that, tilt adjustments are made on the third rear lens group L3R again, thereby forming a lens barrel LX with excellent optical performance. Consequently, compared to a lens barrel in which one lens (lens group) is subject to tilt adjustments, improved optical performance by virtue of tilt adjustments can be expected.

In the tilt adjustment of the first lens group L1, the location of the sliding cam 31 is adjusted from the front-side opening of the lens barrel LX in the state before the ornament ring 33 is attached, so that tilt adjustments can be realized with ease. In the tilt adjustment of the third rear lens group L3R, the lens barrel LX is set in telephoto mode, and the position where the cylindrical cam 51 is rotated is adjusted through each of the throughholes 102 and 112 of the fixing barrel 10 and the zoom ring 11, so that tilt adjustments can be realized with ease. Consequently, even after a number of lenses L1 to L4 are assembled side by side inside the lens barrel LX along the optical axis direction, it is still possible to make tilt adjustments with respect to lenses that are disposed in the middle of these multiple lenses in the optical axis direction, so that the optical performance of the lens barrel LX can be improved.

In the tilt mechanism T1 of the lens group L1, the cam projection 211 is caught in the cam groove 311 of the sliding cam 31 in the optical axis direction and cam-engaged in this state, so that, even when the pressing force of the pressing piece 322 weakens, it is still possible to maintain the location of the cam projection 211 in the optical axis direction—that is, the posture of the first lens group L1—in a stable manner, it is possible to maintain the optical performance achieved by tilt adjustments.

The present invention is not limited to the above-described lens barrel, and can also be applied to a lens barrel that is integrated in the camera body. Also, the present invention is not limited to a lens barrel for a camera for taking still images, and can be applied to a lens barrel for a camera for taking movies, and, furthermore, applied to a lens barrel for a digital imaging device. Furthermore, the present invention obviously covers mode in which a camera or an imaging device for taking movies is structured so that the lens barrel is used as a replacement lens or assembled integrally in the device body.

The present invention has only to provide a lens barrel, in which a first lens, a second lens, and another lens are provided, and in which the inclination of the first lens and the second lens with respect to the other lens can be adjusted.

As described above, the lens of the present invention may be a single-element lens, or may be a lens group that is comprised of a number of single-element lenses, and these will be collectively referred to as "lenses." Consequently, according to the present invention, it is possible to adjust inclination with respect to one lens, adjust inclination with respect to a lens group, or adjust inclination with respect to a number of lens groups Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A lens barrel comprising:
   a plurality of lenses comprising:
      at least one lens arranged on an opening side of the lens barrel in an optical axis direction;
      at least another lens arranged in the optical axis direction;
   one inclination adjuster that adjusts an inclination of the at least one lens through the opening and comprising:
      sliding cams, which are disposed in a plurality of places in the lens barrel along a circumferential direction, and which can be moved and adjusted in a circumferential direction, wherein the sliding cams each comprise a cam groove, a location of which with respect to the optical axis is displaced in the circumferential direction; and
      cam projections which are disposed in a plurality of places in a lens frame of the at least one lens in the circumferential direction, wherein the cam projections are structured so that the cam projections are engaged in the cam grooves, a position of movement of the cam projections in the optical axis direction is adjusted by movement of the sliding cams in a state the cam projections are constrained in the optical axis direction by the cam grooves, and the sliding cams are moved and adjusted through the opening;

another inclination adjuster that adjusts, independently of the adjusting performed by the one inclination adjuster, an inclination of the at least another lens through throughholes which are:

opened in a diameter direction;

provided in a part of a barrel and a ring; and provided to penetrate a peripheral surface of the lens barrel in a diameter direction, the another inclination adjuster comprising:

cylindrical cams, which are disposed in a plurality of places in the lens barrel in the circumferential direction, and which can be rotated and adjusted;

cam arms, which are disposed in a plurality of places in a lens frame of the at least another lens in a circumferential direction; and a biaser which biases the cam arms in the optical axis direction towards the cylindrical cams, wherein:

a circumferential surface of the cylindrical cams is a cam surface, a diameter size of which changes in the circumferential direction, the cam arms are structured such that the cam arms abut the cam surface in the optical axis direction, and a location of the cam arms in the optical axis direction is adjusted by changing the position where the cylindrical cams are rotated, throughholes, which are opened in a diameter direction, are provided in a part of a barrel and a ring, and the cylindrical cams are rotatable through the throughholes.

2. An imaging device comprising the lens barrel according to claim 1.

3. A lens barrel with an inclination adjustment mechanism, which adjusts an angle of inclination of a lens frame for holding a lens with respect to an optical axis, the lens barrel comprising:

sliding cams, which are disposed in a plurality of places in the lens barrel in a circumferential direction, and which can be moved and adjusted in the circumferential direction; and cam projections, which are disposed in a plurality of places in the lens frame in a circumferential direction, wherein:

the sliding cams each comprise a cam groove, a location of which with respect to an optical axis is displaced in the circumferential direction; and the cam projections are structured so that the cam projections are engaged in the cam grooves, and a position of movement of the cam projections in the optical axis direction is adjusted by movement of the sliding cams in a state the cam projections are constrained to the optical axis direction by the cam grooves.

4. The lens barrel according to claim 3, further comprising a pressing piece, which biases the cam projections in the optical axis direction, wherein the cam projections abut on one lateral surface of the cam grooves in the optical axis direction.

5. The lens barrel according to claim 4, wherein:

the sliding cams are sandwiched between a ring member, which is attached to a barrel member constituting the lens barrel, and the barrel member, in the optical axis direction; and the pressing piece is formed integrally with the ring member.

6. A lens barrel with an inclination adjustment mechanism, which adjusts an angle of inclination of a lens frame for holding a lens with respect to an optical axis, the lens barrel comprising:

cylindrical cams, which are disposed in a plurality of places in the lens barrel in a circumferential direction, and which can be rotated and adjusted;

cam arms, which are disposed in a plurality of places in the lens frame in a circumferential direction; and a biaser, which biases the cam arms in the optical axis direction towards the cylindrical cams, wherein:

a circumferential surface of the cylindrical cams is structured as a cam surface, a diameter size of which changes in the circumferential direction; and the cam arms are structured so that the cam arms abut on the cam surface in the optical axis direction, and a location of the cam arms in the optical axis direction is adjusted by changing the position where the cylindrical cams are rotated.

7. The lens barrel according to claim 6, wherein:

the lens barrel comprises throughholes, which are opened in a part of a barrel member and a ring member in a diameter direction; and the cylindrical cams are exposed to outside of the barrel through the throughholes.

8. The lens barrel according to claim 7, wherein:

the lens barrel comprises a barrel member and a ring member which overlap in the diameter direction and are relatively rotatable about a barrel axis;

the throughholes, which are opened in the diameter direction, are provided in predetermined locations in the barrel member and the ring member; and each throughhole overlaps in a rotational position of the barrel member and the ring member, and the cylindrical cams are exposed to outside of the barrel through these throughholes.

9. The lens barrel according to claim 7, wherein the throughholes are closed with a covering member that is disposed in a peripheral surface of the barrel member and the ring member.

* * * * *